United States Patent Office 2,753,718
Patented July 10, 1956

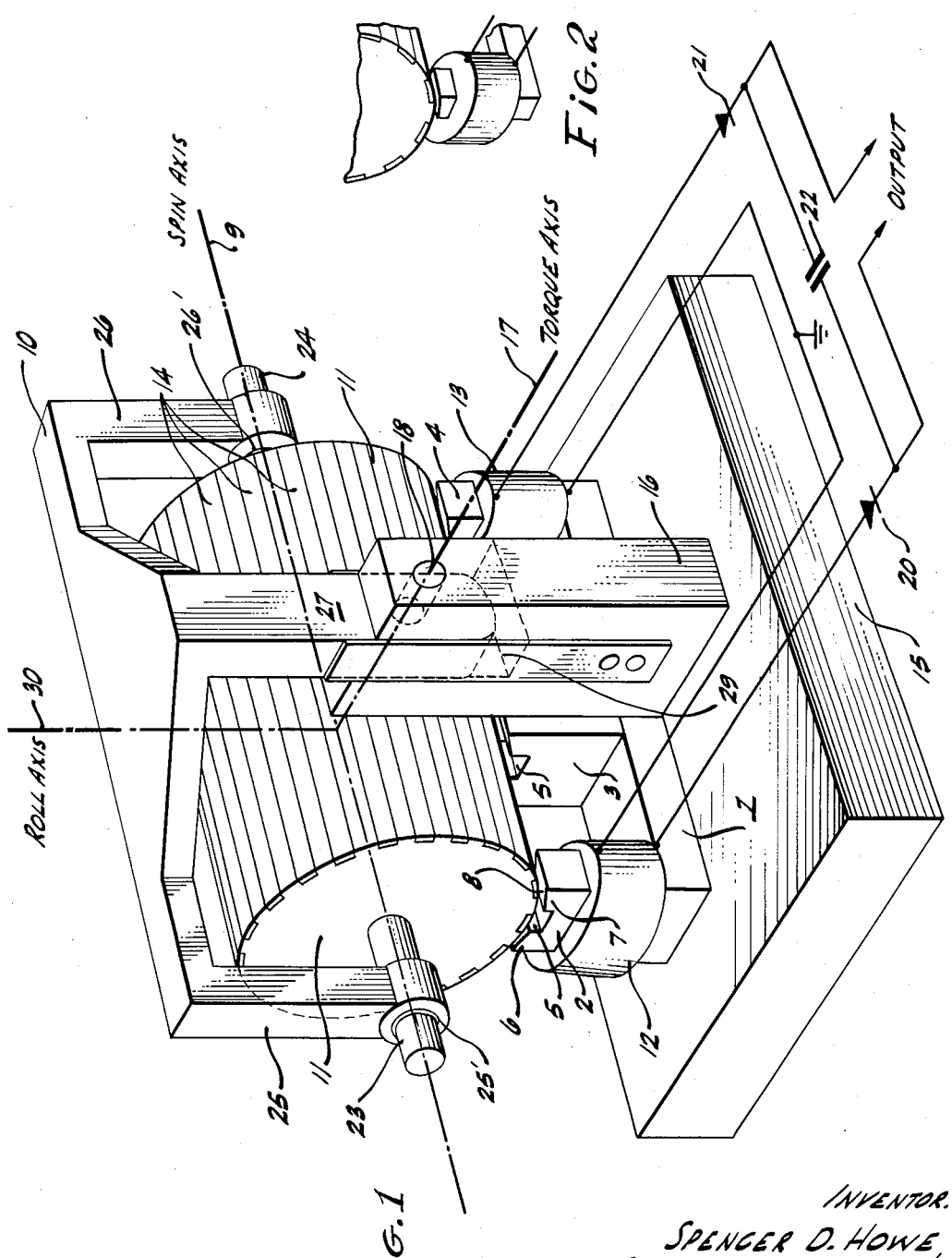

2,753,718
INDUCED VOLTAGE PICKOFF FOR RATE GYROS

Spencer Douglas Howe, Los Angeles, Calif., assignor to Hughes Aircraft Company, Culver City, Calif., a corporation of Delaware Application July 20, 1954, Serial No. 444,420

10 Claims. (Cl. 74—5.6)

This invention relates to gyroscopic mechanisms, and more particularly to a rate gyro and means utilizing the gyro rotor to produce electric signals which represent the turning of the rotor about an axis perpendicular to its spin axis.

Generally, for variable reluctance pickoffs used in conjunction with rate gyros, a bar attached to the movable gimbal is used as part of the magnetic circuit. An independent source of alternating current induces an alternating magnetic flux into a portion of a magnetic core, such as the center leg of an E-shaped magnetic core. Where such an E-shaped core is used, its legs are located adjacent the movable bar. The alternating flux induced into the center leg of the core traverses the air space separating it from the rotor and then enters the bar. There the flux divides in inverse proportion to the air gaps between the surface of the bar and the outer legs of the E-shaped magnetic core, which provides a return path of the magnetic circuit to the center leg of the E-shaped magnetic core. This division of the flux is due to the reluctance of the air gaps. The outer legs of the core carry balance induction coils which serve as a pickoff means, their output being inversely proportional to the length of the air gap. The gimbal frame is pivoted in a plane perpendicular to the plane containing the E-shaped magnetic core, the axis of this pivot being perpendicular to the center line of the gyro rotor and passing through the middle of the rotor body.

The gyro rotor axis will be referred to as a spin axis, and the gyro pivot axis will be referred to as a torque axis. The axis perpendicular to the spin axis and the torque axis is the roll axis. Due to the inherent properties of the spinning rotor, the size of the two outer air gaps will change as the direction of the gyro spin axis changes relative to the frame which holds the E-shaped core and supports the torque axis. The signals from the pickoff coils give an indication of the rate of rotation of the frame about the roll axis which is suffered by the gyro rotor.

The disadvantage of the system above described is the necessity of having to provide a separate source of alternating current for the creation of an alternating magnetic flux for the described magnetic circuit. This requirement for a separate power supply becomes especially burdensome where space is at a premium.

It is an object of this invention to provide a variable reluctance pickoff for rate gyros without the use of an external supply of alternating current.

It is a further object of this invention to provide a rate gyro in which the gyro rotor is adapted to generate an alternating magnetic flux from which to obtain electric signals representative of the rate of turn of said rotor with respect to its spin axis.

Briefly, the present invention utilizes an E-shaped core in which the center leg is a permanent magnet. The circumferential area of the gyro rotor is divided into strips of alternatingly magnetic and non-magnetic materials parallel to the spin axis. The passing of the alternate magnetic and non-magnetic strips over the legs of the E-shaped magnetic core effects interruptions of the flux from the center leg which result in an alternating component of magnetic flux through the outer legs. Alternating signals are thus induced in the outer legs of the core, and any difference between such signals is proportional to the change of position of the gyro about the torque axis, i. e., the rate of change of angular position about roll axis.

The novel features which are believed to be characteristic of the invention, both as to its organization and method of operation, together with further objects and advantages thereof, will be better understood from the following description considered in connection with the accompanying drawings, in which an embodiment of the invention is illustrated by way of example. The scope of the invention is pointed out in the appended claims.

Fig. 1 is a perspective view showing an induced voltage pickoff for rate gyros.

Fig. 2 is a fragmentary view showing a modified form of the E-shaped magnetic core of Fig. 1.

Referring to the drawing, in which Fig. 1 illustrates a rate gyro in accordance with this invention, and which is made part of this specification, an E-shaped magnetic core 1 has three legs 2, 3, and 4, each of which is shown with a U-shaped slot 5 of width W and of arbitrary depth. The sides or legs 6 and 7 of the slots 5 are each of width W, so that the total breadth of each leg is 3W. The center leg 3 is a permanent magnet permanently fastened to the core 1. The back of core 1 and the legs 2 and 4 are made of ferromagnetic material, such as soft iron. The outer legs 2 and 4 are surrounded by pickup coils 12 and 13, respectively. One end of each coil is grounded. The other ends of the coils 12, 13 are connected through respective rectifiers 20 and 21 to a common output circuit. The capacitor 22 is placed across the output terminals. Where leg 3 is forked, the forked ends are of the same polarity, i. e., it is poled in the manner of a bar magnet which is slotted on one end.

A gyro rotor 11, preferably of non-magnetic material, has imbedded in it, circumferentially and parallel to the gyro rotor or spin axis 9, inserts 14 made of magnetic material having a length of arc equal to W. The spaces between the inserts 14 also have a length of arc equal to W. The rotor 11 is mounted on a shaft, the ends 23, 24 of which extend beyond the ends of the rotor 11. One end of the shaft can be connected to and driven by a suitable motor, or, as per the usual construction, the motor could be built directly into the rotor, i. e., the motor is designed "inside-out" so that the shaft stays still and the body rotates.

The rotor 11 is supported by a cage-like structure 10. Cage 10 has a pair of spaced arms or legs 25 and 26 which are provided with bearings 25', 26' at their extremities to receive the ends 23, 24 of the rotor shaft. A support arm or leg 27 for cage 10 is seated in a slot of a support member 16 which is mounted on base 15. A pivot pin 18 extends through the upper portion of support member 16 and the end of leg 27. Pivot pin 18 is located on the torque axis 17 of rotor 11. The relationship between the spin axis 9 and the torque axis 17 is such that they are at right angles to one another and intersect.

Two identical pieces of flat spring steel 29 are mounted on opposite sides of support 16 and extend a short distance along opposite sides of leg 27. The flat pieces of spring steel 29 press against the sides of leg 27 and tend to keep the cage in such a position that the spin axis 9 is parallel to the base 15. This is the neutral position of the cage. The steel springs 29 restrain but do not prevent motion of the cage about the torque axis if a torque is applied to the cage. The amount of rotation will be a function of the torque and the spring constant of the restraining spring.

Also mounted on base 15 is the core 1 described above with its legs facing the rotor. The extremities of the sides 6 and 7 of the U-shaped slots in the legs 2, 3, and 4 form circular segments having respective centers of curvature which lie on the spin axis 9, when the cage is in its neutral position. Cage 10 is in its neutral position when the gaps between rotor 11 and legs 2 and 4 are substantially equal.

After the gyro is brought up to speed, the interruptions of the magnetic circuit caused by the non-magnetic strips produce an alternating magnetic flux in the magnetic circuit. The frequency of these interruptions is equal to the number of revolutions per second of the gyro rotor 11 multiplied by the number of magnetic inserts 14 in the rotor. The output of the coils 12 and 13 which link the flux through the two magnetic circuits will be equal if the base 15 is stationary in space, provided that the cage 10 is in its neutral position.

The whole structure above described has a roll axis 30 which is perpendicular to both spin axis 9 and torque axis 17. If the structure is rotated about the roll axis 30, the spinning gyro rotor 11 will exert a torque about the torque axis 17 which will cause the cage 10 to rotate and consequently the air gaps between the outer legs of the E-shaped magnetic core and the gyro rotor to change. The result is a change in the reluctance of the magnetic circuit starting from leg 3 to leg 2 and leg 4, respectively. Coils 12 and 13, which link the magnetic circuits, will therefore have an output proportional to the amount of flux passing through legs 2 and 4, respectively. If the amount of flux in these two legs is unequal because of the difference in the length of the air gap caused by the motion of the gyro about the torque axis, the pickup coils will have unequal outputs which will be a measure of the amount of rotation of the structure about the roll axis 30. These signals may then be utilized in a conventional manner to effect reduction in the amount of roll about roll axis 30.

It will be evident that certain parts of the structure described above might have different configurations. For example, the gyro rotor could be of the inside-out motor type in which the rotor is made of magnetic material having non-magnetic inserts. The E-shaped magnetic core could be comprised of two adjacent U-shaped cores, the adjacent legs of each being a permanent magnet and their remote legs carrying induction coils. Further, the legs of the magnetic core need not have U-shaped slots but could be solid as long as the width of the legs is substantially equal to the width of the strip inserts in the gyro rotor as shown in Fig. 2. The induction coils can be independent from one another and their output compared by any convenient bridge circuit.

Cage 10, support 16 and flat spring members 29 have been illustrated in simple form to avoid unnecessary complication of structure and for ease of description. It will be understood that conventional gimbal structures would be employed to support rotor 11 in the manner of the structure here described.

What is claimed is:

1. A gyroscope including a rotor, said rotor having alternately spaced magnetic and non-magnetic members, said magnetic and non-magnetic members being of equal width, said members being parallel to the axis of said rotor and circumferentially spaced about said rotor, a cage to suspend said rotor about a torque axis intersecting and perpendicular to the rotor axis, spring means to restrain said cake from free motion about said torque axis but permitting limited motion of said cage against the spring pressure on the application of a torque about said torque axis, an E-shaped magnetic core, the plane of said core passing through the rotor axis, the legs of said core being disposed adjacent said rotor, said legs being of predetermined width, the center leg of said core being a permanent magnet, a pair of induction coils, said coils being supported on the respective outer legs of said core, and a common output circuit connected to said coils.

2. A gyroscope including a rotor, said rotor having alternately spaced magnetic and non-magnetic members, said magnetic and non-magnetic members being of equal width, said members being parallel to the axis of said rotor and circumferentially spaced about said rotor, a cage to suspend said rotor about a torque axis intersecting and perpendicular to the rotor axis, spring means to restrain said cage from free motion about said torque axis but permitting limited motion of said cage against the spring pressure on the application of a torque about said torque axis, an E-shaped magnetic core, the plane of said core passing through the rotor axis, the legs of said core being disposed adjacent said rotor, said legs of said core having U-shaped slots parallel to the plane of said core and of such width that the walls of either side of said slots are equal to the width of said slot, the width of said slot also being substantially the same as the arc subtended by one of said members in the rotor circumference, the center leg of said core being a permanent magnet, a pair of induction coils, said coils being supported on the respective outer legs of said core, and a common output circuit connected to said coils.

3. A gyroscope including a rotor, said rotor having alternately spaced magnetic and non-magnetic members, said magnetic and non-magnetic members being of equal width, said members being parallel to the axis of said rotor and circumferentially spaced about said rotor, a cage to suspend said rotor about a torque axis intersecting and perpendicular to the rotor axis, spring means to restrain said cage from free motion about said torque axis but permitting limited motion of said cage against the spring pressure on the application of a torque about said torque axis, two U-shaped magnetic cores, the plane of said cores passing through the rotor axis, the legs of said cores being disposed adjacent to said rotor, the width of said legs being substantially thrice the arc subtended by one of said members in the rotor circumference, the legs closest together of said cores being permanent magnets, a pair of induction coils, said coils being supported on the respective outer legs of said cores, and a common output circuit connected to said coils.

4. In combination with a gyroscopic system having A, B, and C axes, an arrangement for measuring rotary motion about the A axis comprising a rotor adapted to spin about the B axis, a support for said rotor, said support including spring bias means adapted to permit limited motion of said rotor about the C axis, said A, B, and C axes intersecting at a common point midway between the ends of said rotor and being mutually perpendicular; said rotor having a circumferential area comprising alternate strips of magnetic and non-magnetic material parallel to the B axis, means for rotating said rotor about the B axis, an E-shaped magnetic core, the legs of said core being in the plane formed by the A and B axes, the ends of said legs facing said rotor, said legs having a width which is substantially equal to the arc subtended by one of said alternate strips, the center leg of said core being a permanent magnet, whereby two magnetic paths exist between the center leg and the respective outer legs of said core when any of said strips of magnetic material is adjacent said legs, said magnetic paths being alternately completed and broken by said alternate magnetic and non-magnetic strips upon rotation of said rotor about the B axis, and a pair of coils supported on the respective outer legs, whereby signals are induced in said coils of a frequency equal to the frequency at which said magnetic paths are completed and broken, the amplitudes of the respective signals being inversely proportional to the lengths of the air gaps at the outer legs supporting said coils, and a common output circuit coupled to said coils.

5. In combination with a gyroscopic system having A, B, and C axes, an arrangement for measuring angular velocity about the A axis comprising a rotor adapted to spin about the B axis, a support for said rotor, said support including spring bias means adapted to permit limited motion of said rotor about the C axis, said A, B, and C axes intersecting at a common point midway between the ends of said rotor and being mutually perpendicular; said rotor having a circumferential area comprising alternate strips of magnetic and non-magnetic material parallel to the B axis, means for rotating said rotor about the B axis, an E-shaped magnetic core, the legs of said core being in the plane formed by the A and B axes, the ends of said legs facing said rotor, said legs of said core having U-shaped slots parallel to the plane of said core and of such width that the walls of either side of said slots are equal to the width of said slot, the width of said slot is substantially equal to the arc subtended by one of said alternate strips, the center leg of said core being a permanent magnet, whereby two magnetic paths exist between the center leg and the respective outer legs of said core when any of said strips of magnetic material is adjacent said legs, said magnetic paths being alternately completed and broken by said alternate magnetic and non-magnetic strips upon rotation of said rotor about the B axis, and a pair of coils supported on the respective outer legs, whereby signals are induced in said coils of a frequency equal to the frequency at which said magnetic paths are completed and broken, the amplitudes of the respective signals being inversely proportional to the lengths of the air gaps at the outer legs supporting said coils, and a common output circuit coupled to said coils.

6. In combination with a gyroscopic system having A, B, and C axes, an arrangement for measuring rotational velocity about the A axis comprising a rotor adapted to spin about the B axis, a support for said rotor, said support including spring bias means adapted to permit limited motion of said rotor about the C axis, said A, B, and C axes intersecting at a common point midway between the ends of said rotor and being mutually perpendicular; said rotor having a circumferential area comprising alternate strips of magnetic and non-magnetic material parallel to the B axis, means for rotating said rotor about the B axis, two U-shaped magnetic cores, the legs of said cores being in the plane formed by the A and B axes, the ends of said legs facing said rotor, said legs having a width which is substantially equal to the arc subtended by one of said alternate strips, the two legs closest together of said cores being permanent magnets, whereby two separate magnetic paths exist between said permanent magnet and the respective outer leg of said core when any of said strips of magnetic material is adjacent said legs, said magnetic paths being alternately completed and broken by said alternate magnetic and non-magnetic strips upon rotation of said rotor about the B axis, and a pair of coils supported on the respective outer legs, whereby signals are induced in said coils of a frequency equal to the frequency at which said magnetic paths are completed and broken, the amplitudes of the respective signals being inversely proportional to the lengths of the air gaps at the outer legs supporting said coils, and a common output circuit coupled to said coils.

7. A gyroscopic mechanism in conjunction with a set of variable reluctance pickoff coils for the detection of angular velocity comprising a gyro rotor, an E-shaped magnetic core, and a set of balanced induction coils, said rotor having its circumference divided into strips of equal width of alternately magnetic and non-magnetic material, said strips being parallel to the spin axis of said rotor, said E-shaped core having its legs facing said rotor, the center leg of said core being a permanent magnet, a set of induction coils surrounding the outer legs of said core to provide an output circuit, all legs having a width identical to thrice the width of said strips in said rotor, a cage supporting said rotor permitting rotation about a torque axis perpendicular to the spin axis of said rotor and intersecting said spin axis midway between the ends of said rotor, a set of restraining springs connected to said cage, said cage thereby being restrained from rotary motion in the absence of a torque about said torque axis.

8. In combination with a gyroscopic system, a gyro rotor, said rotor having its circumference divided into strips of equal width of alternately magnetic and non-magnetic material, said strips being parallel to the spin axis of said rotor, an E-shaped core having its legs facing said rotor, the center leg of said core being a permanent magnet, a set of induction coils placed around the outer legs of said core to provide an output circuit, the width of said legs being substantially equal to three times the width of said alternating strips, all legs of said core having a U-shaped slot symmetrically spaced in the extremity of the legs, said slots being parallel to the plane of said core and having a width equal to ⅓ of the width of the leg, a cage supporting said rotor to permit its rotation about a torque axis perpendicular to the spin axis of said rotor and intersecting said spin axis at a point midway between the ends of said rotor, a set of restraining springs connected to said cage to prevent any motion about said torque axis in the absence of a torque about said axis.

9. In combination with a gyroscopic system, a gyro rotor, said rotor having its circumference divided into strips of equal width of alternately magnetic and non-magnetic material, said strips being parallel to the spin axis of said rotor, an E-shaped core having its legs facing said rotor, the center leg of said core being a permanent magnet, a set of induction coils placed around the outer legs of said core to provide an output circuit, the width of said legs being substantially equal to the width of said alternating strips, a cage supporting said rotor to permit its rotation about a torque axis perpendicular to the spin axis of said rotor and intersecting said spin axis at a point midway between the ends of said rotor, a set of restraining springs connected to said cage to prevent any motion about said torque axis in the absence of a torque about said axis.

10. In combination, a pair of magnetic circuits having a common permanent magnet, said magnetic circuit including an E-shaped magnetic core and a gyro rotor, said permanent magnet being the center leg of said E-shaped magnetic core, the legs of said core facing said rotor, said rotor being pivoted about a torque axis perpendicular to the plane of said core and intersecting the spin axis of said rotor at a point midway between the ends of said rotor, said spin axis also being located in the plane of said core and parallel to the legs of said core, said rotor having alternately magnetic and non-magnetic inserts parallel to its spin axis and circumferentially spaced about said rotor, the arcs subtended by said inserts all being equal, said legs of said core having a width substantially equal to the width of said inserts, a support structure holding said rotor, a set of restraining springs holding said support structure so that the spin axis is parallel to the extremities of the legs of said core, said restraining springs permitting limited rotary motion of said rotor about said torque axis when a torque is applied, a set of induction coils placed around the outer legs of said core, the output of said coils being responsive to the reluctance in their respective magnetic paths, said magnetic paths being equal in the absence of a torque applied about the torque axis of said rotor.

References Cited in the file of this patent

UNITED STATES PATENTS 2,292,090    Reichel _____ Aug. 4, 1942

FOREIGN PATENTS 1,054,150    France _____ Oct. 7, 1953